United States Patent
Huang et al.

(10) Patent No.: US 9,110,634 B2
(45) Date of Patent: Aug. 18, 2015

(54) ELECTRONIC APPARATUS

(71) Applicant: Acer Incorporated, New Taipei (TW)

(72) Inventors: Yi-Ta Huang, New Taipei (TW); Cheng-Nan Ling, New Taipei (TW); Hsien-Wei Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 142 days.

(21) Appl. No.: 13/925,851

(22) Filed: Jun. 25, 2013

(65) Prior Publication Data

US 2014/0334085 A1    Nov. 13, 2014

(30) Foreign Application Priority Data

May 13, 2013 (TW) .............................. 102116933 A

(51) Int. Cl.
     *G06F 1/16*      (2006.01)
(52) U.S. Cl.
     CPC ............ *G06F 1/1667* (2013.01); *G06F 1/1618* (2013.01); *G06F 1/1662* (2013.01)
(58) Field of Classification Search
     CPC .... G06F 1/1618; G06F 1/1662; G06F 1/1664
     USPC .................................................... 361/679.09
     See application file for complete search history.

(56) References Cited

U.S. PATENT DOCUMENTS

| | | | |
|---|---|---|---|
| 6,492,974 B1 * | 12/2002 | Nobuchi et al. | 345/156 |
| 6,700,773 B1 * | 3/2004 | Adriaansen et al. | 361/679.08 |
| 7,286,341 B1 * | 10/2007 | Chang et al. | 361/679.09 |
| 7,393,151 B1 * | 7/2008 | Miller, Jr. | 400/682 |
| 2006/0007648 A1 * | 1/2006 | Wang | 361/683 |

FOREIGN PATENT DOCUMENTS

| | | |
|---|---|---|
| TW | M444694 | 1/2013 |
| TW | M445832 | 1/2013 |

* cited by examiner

*Primary Examiner* — Anthony Q Edwards
(74) *Attorney, Agent, or Firm* — Jianq Chyun IP Office

(57) ABSTRACT

An electronic apparatus includes a first body, a second body and a keyboard. The first body has a display surface and an appearance surface opposite to each other. The second body is pivoted to the first body and has an accommodating opening and a first surface and a second surface opposite to the first surface, in which when the first body is closed to the second body, the first surface faces the display surface. The keyboard is pivoted at the accommodating opening through at least one rotation-shaft, in which when the first body is turned over relatively to the second body, the keyboard is able to be turned over relatively to the second body, so that when the second surface faces the appearance surface, the first body covers a plurality of keys of the keyboard.

6 Claims, 5 Drawing Sheets

ELECTRONIC APPARATUS

CROSS-REFERENCE TO RELATED APPLICATION

This application claims the priority benefit of Taiwan application serial no. 102116933, filed on May 13, 2013. The entirety of the above-mentioned patent application is hereby incorporated by reference herein and made a part of this specification.

BACKGROUND OF THE INVENTION

1. Field of the Invention

The invention generally relates to an electronic apparatus, and more particularly, to an electronic apparatus able to turn over the keyboard thereof.

2. Description of Related Art

Along with the ceaseless progress of science and technology, more complex and more humanized electronic products have been upgraded all the time. Taking a computer as an example, in our common living and work, the computer has gradually become indispensable important means. The notebook computer has the same function as a regular desktop computer, which in association with its compact and lightweight features is quite convenient for a user to portably carry it. In addition, the touch technology and various applications of electronic products get rapid developments in recent years, so that the touch device has become very popular. With the updating and upgrading of operation system (OS), the OS used to the notebook computer also gradually begins with adopting the touch-based input device as its primary input device.

In recent years, the thinning electronic apparatus has gradually become the design tendency of the notebook computer, and in response to the tendency for the OS to introduce the touch function, it is an inevitable tendency to incorporate a notebook computer with a tablet computer. For example, when the first body (screen) of a notebook computer is turned over to the back of the second body and is closed to the second body, the notebook computer appears like a similar tablet computer. However, when the first body (screen) of a notebook computer is turned over to the back of the second body (host), the keyboard on the second body is exposed, which easily increases the chance for the user to carelessly scratch the keyboard or making the keys fall off.

SUMMARY OF THE INVENTION

Accordingly, the invention is directed to an electronic apparatus, wherein the keyboard can be turned over relatively to the second body so as to be covered and protected by the first body.

An electronic apparatus includes a first body, a second body and a keyboard. The first body has a display surface and an appearance surface opposite to each other. The second body is pivoted to the first body and has an accommodating opening and a first surface and a second surface opposite to the first surface, in which when the first body is closed to the second body, the first surface faces the display surface. The keyboard is pivoted at the accommodating opening through at least one rotation-shaft, in which when the first body is unfolded from the second body and turned over, the keyboard is able to be turned over relatively to the second body, so that when the second surface faces the appearance surface, the first body covers a plurality of keys of the keyboard.

Based on the depiction above, the electronic apparatus of the invention can adjust the angle of the keyboard in different operation modes by means of the keyboard able to be turned over, and thus, the keys can be covered and protected by the first body. The electronic apparatus of the invention can avoid the keys of the keyboard from exposure to make the keys scratched or fall off when the first body is turned over to the back of the second body.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1A:
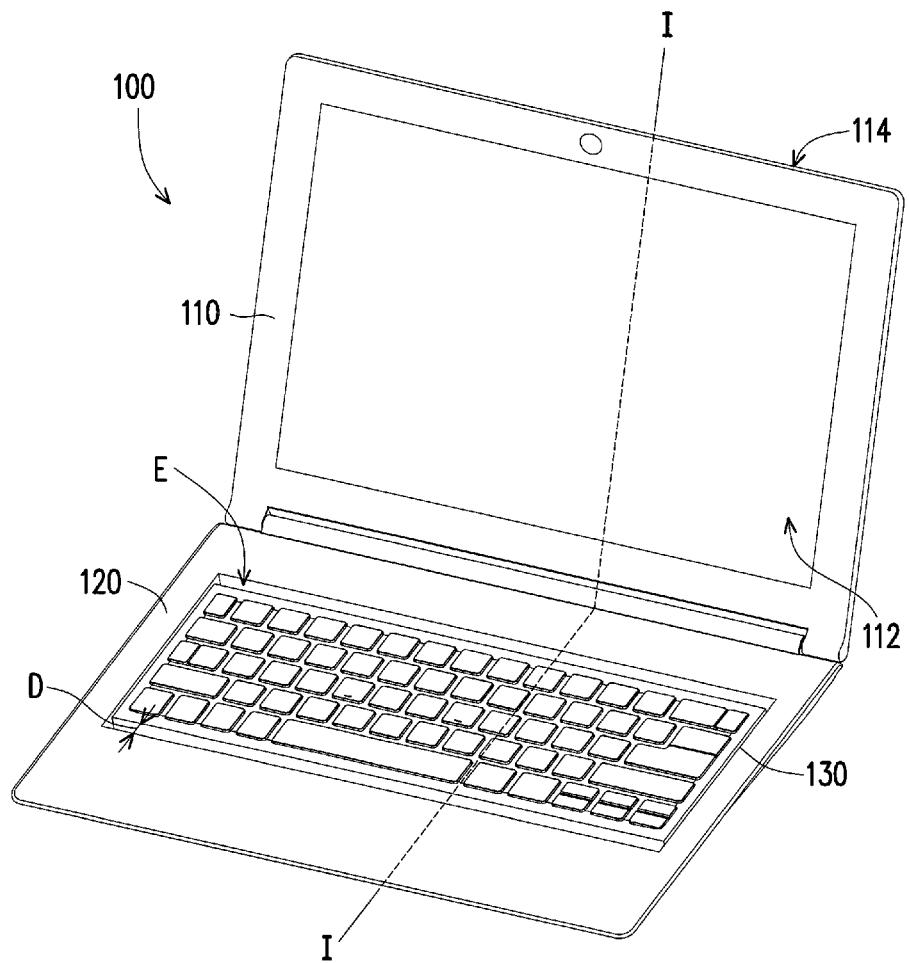
FIG. 1A is a schematic diagram of an electronic apparatus according to an embodiment of the invention.
Figure 1B:
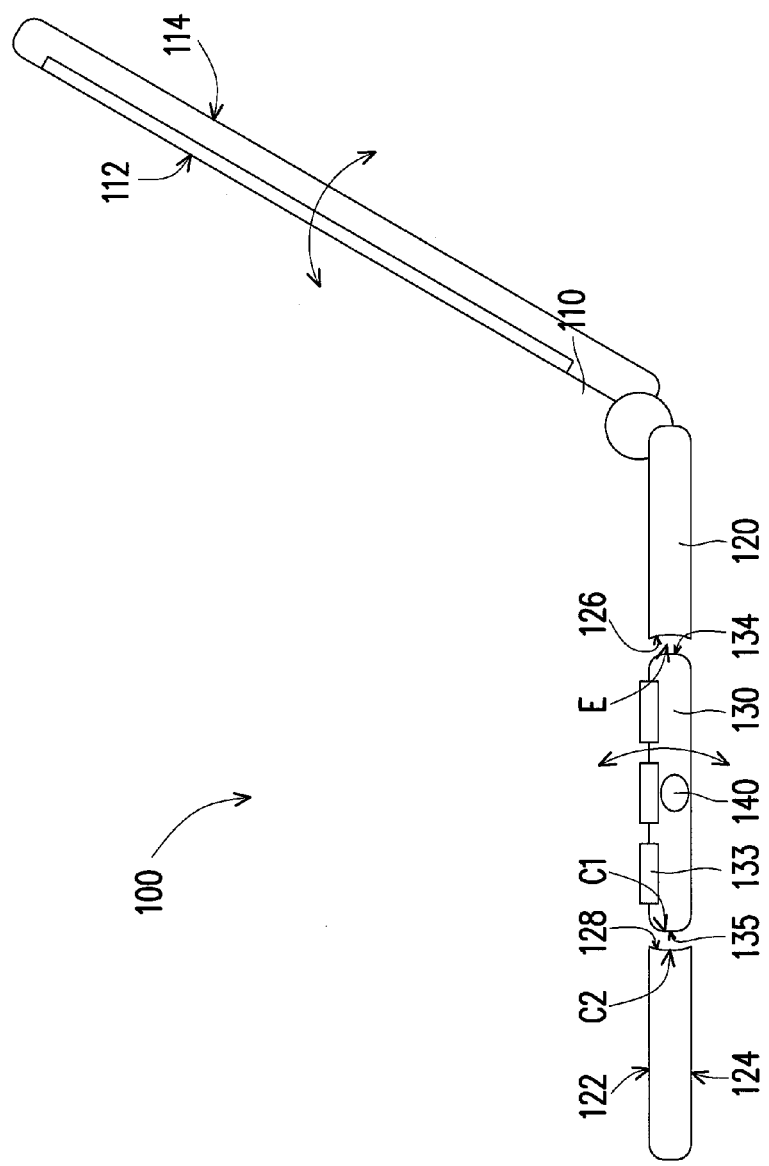
FIG. 1B is a cross-sectional diagram of the electronic apparatus of FIG. 1A along line I-I.
Figure 2A:
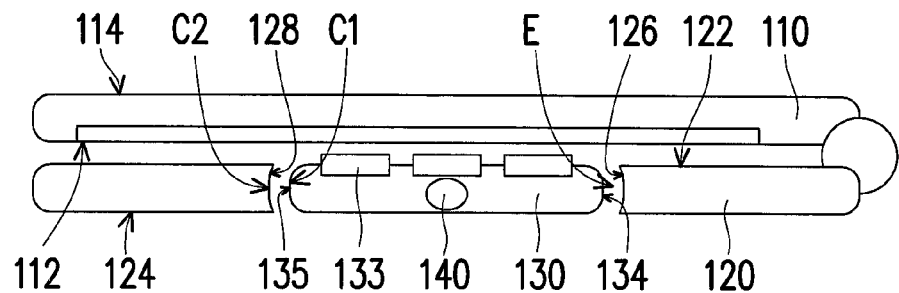
FIG. 2A is a cross-sectional diagram of the electronic apparatus of FIG. 1B in a folded state.
Figure 2B:
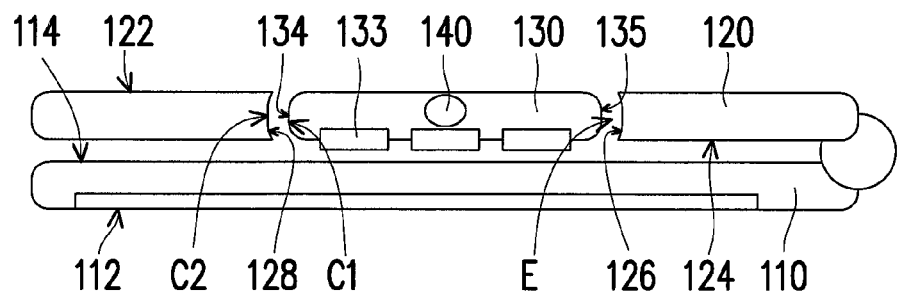
FIG. 2B is a cross-sectional diagram of the electronic apparatus of FIG. 1B in another folded state.

FIG. 1A is a schematic diagram of an electronic apparatus according to an embodiment of the invention, FIG. 1B is a cross-sectional diagram of the electronic apparatus of FIG. 1A along line I-I and FIG. 2A is a cross-sectional diagram of the electronic apparatus of FIG. 1B in a folded state. Referring to FIGS. 1A-2A, an electronic apparatus 100 of the embodiment includes a first body 110, a second body 120 and a keyboard 130. The first body 110 has a display surface 112 and an appearance surface 114 opposite to the display surface 112. The second body 120 is pivoted to the first body 110 and has an accommodating opening E and a first surface 122 and a second surface 124 opposite to the first surface 122. When the first body 110 is closed to the second body 120, the first surface 122 faces the display surface 112. The keyboard 130 uses at least one rotation-shaft 140 to be pivoted at the accommodating opening E. In the embodiment, there are two rotation-shafts 140 in total respectively disposed at both opposite sides of the keyboard 130. FIG. 2B is a cross-sectional diagram of the electronic apparatus of FIG. 1B in another folded state. Referring to FIGS. 1B and 2B again, when the first body 110 is unfolded from the second body 120 and turned over, the keyboard 130 is able to be turned over relatively to the second body 120 to make the first body 110 cover a plurality of keys 133 of the keyboard 130 when the second surface 124 faces the appearance surface 114 (as shown in FIG. 2B).

In more details, in the embodiment, the keyboard 130 has a first side-wall 134 and a second side-wall 135 opposite to each other, and the first side-wall 134 and the second side-wall 135 are the two opposite side-walls 134 and 135 in the keyboard 130, wherein the side-walls 134 and 135 are not pivoted to the second body 120. In other words, when the keyboard 130 gets turned over relatively to the second body 120 around the axis of the rotation-shaft 140, the first side-wall 134 and the second side-wall 135 facing into the accommodating opening E would be altered along with the turningover-angle of the keyboard 130. For example, in the second body 120, there are a first accommodating side-wall 126 and a second accommodating side-wall 128 opposite to each other and surrounding the accommodating opening E. When the first body 110 moves from the state of FIG. 1B to the state of FIG. 2A, the first surface 122 faces the display surface 112, and the first side-wall 134 and the second side-wall 135 respectively face the first accommodating side-wall 126 and the second accommodating side-wall 128; when the first body 110 moves from the state of FIG. 1B to the state of FIG. 2B, the keyboard 130 gets turned over relatively to the second body 120 so that the second surface 124 faces the appearance surface 114 and the first side-wall 134 and the second side-wall 135 respectively face the second accommodating side-wall 128 and the first accommodating side-wall 126. The invention does not limit the rotation direction of the keyboard 130.

In the embodiment, the first body 110 can be unfolded from the second body 120 and turned over to the back of the second body 120, and the keyboard 130 of the electronic apparatus 100 can be rotatively disposed in the accommodating opening E of the second body 120. The keyboard 130 can rotate relatively to the second body 120 through the rotation-shaft 140, so that the first body 110 in different folded states (as shown by FIGS. 2A and 2B) can cover the keyboard 130. In this way, the electronic apparatus 100 of the embodiment can avoid the keys 133 of the keyboard 130 from exposure to make the keys 133 scratched or fall off when the first body 110 is turned over to the back of the second body 120.

In addition, in the embodiment, the keyboard 130 can be turned over relatively to the second body 120, and accordingly, the accommodating opening E and the keyboard 130 are not closely matched entirely to each other. For example, both the first side-wall 134 and the second side-wall 135 of the keyboard 130 and both the first accommodating side-wall 126 and the second accommodating side-wall 128 in the accommodating opening E keep a gap D therebetween (as shown in FIG. 1A) to avoid the corners of the keyboard 130 and the second body 120 from interference therebetween when the keyboard 130 is turned over relatively to the second body 120. For keeping the appearance unaffected by an excessive gap D between the keyboard 130 and the accommodating opening E, both the first side-wall 134 and the second side-wall 135 are respectively an arc surface C1, and the arc surfaces C1 are surfaces which are convex respectively from the centers of the two side-walls 134 and 135 up and then gradually shrunk towards the upper side and the lower side of each of the side-walls 134 and 135 so as to decrease the gap D between the keyboard 130 and the accommodating opening E. In addition, the first accommodating side-wall 126 and the second accommodating side-wall 128 of the accommodating opening E facing the side-walls 134 and 135 can respectively be a dent C2, in which the arc surfaces C1 and the dents C2 are complementary to each other. However, the invention does not limit the shape of the side-wall. In other unshown embodiments, the upper and lower two sides can respectively be a chamfer, which functions also to avoid the corners of the keyboard and the second body from interference therebetween.

Figure 3A:
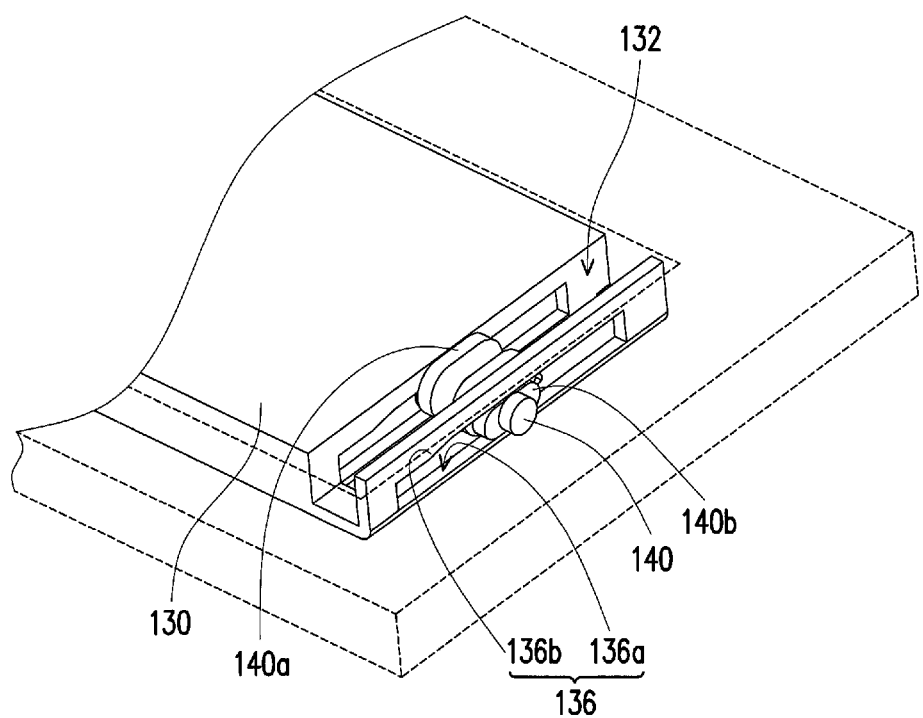
FIG. 3A is a schematic diagram of the electronic apparatus of FIG. 1A around a rotation-shaft thereof.

FIG. 3A is a schematic diagram of the electronic apparatus of FIG. 1A around a rotation-shaft thereof. Referring to FIGS. 1A, 1B and 3A, for better showing the structure around the rotation-shaft 140, the second body 120 is marked in hidden lines, and partial structures of the keyboard 130 and the second body 120 are omitted as well. In the embodiment, the keyboard 130 can be pivoted in the accommodating opening E of the second body 120 through at least one rotation-shaft 140. For example, two rotation-shafts 140 are respectively disposed at the left and right two sides of the keyboard 130, and each of the rotation-shafts 140 is located at the center of the side-edge of the keyboard 130. The design that the rotation-shaft 140 is located at the center of the keyboard 130 can avoid an excessive accommodating opening E due to an excessive moving range of the keyboard 130 when the keyboard 130 is turned over. In addition, for fixing the turning-over-angle of the keyboard 130 relatively to the body, in the embodiment, the rotation-shaft 140 has a torsional part 140a for fixing the turning-over-angle of the keyboard 130 relatively to the second body 120. The torsional part 140a surrounds the rotation-shaft 140 and is located in a recess 132 of the keyboard 130. The torsional part 140a is, for example, implemented with a damper, which the invention is not limited to.

Figure 3B:
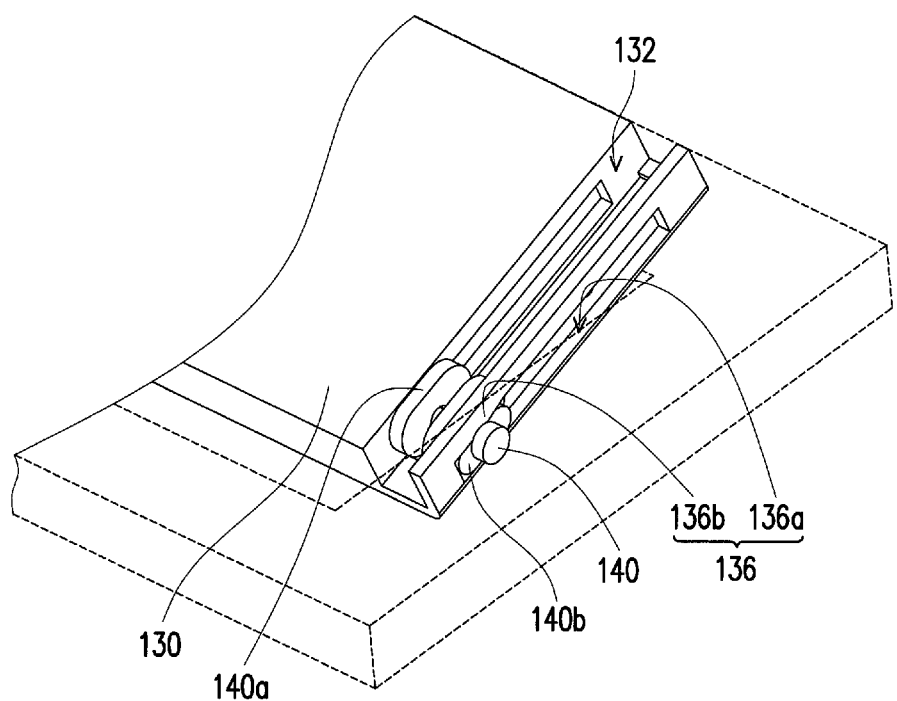
FIG. 3B is a schematic diagram showing the chute in FIG. 3A moves to a fixing position relatively to the rotation-shaft.

FIG. 3B is a schematic diagram showing the chute in FIG. 3A moves to a fixing position relatively to the rotation-shaft. Referring to FIGS. 3B and 3A, in the embodiment, in addition to being turned over relatively to the second body 120, the keyboard 130 further can slide relatively to the second body 120, so that after the keyboard 130 rises up with turning relatively to the second body 120, the keyboard 130 slides to a fixed position to facilitate the operation of the user. For example, the keyboard 130 in FIG. 3A further includes at least one sliding portion 136, and the number of the sliding portions 136 is corresponding to the number of the rotation-shafts 140. Each of the sliding portions 136 is corresponding to a rotation-shaft 140 and disposed at a side of the keyboard 130 pivoted to the second body 120. The sliding portion 136 includes at least one chute 136a, and the rotation-shaft 140 goes through the chute 136a to be pivoted to the keyboard 130. In the embodiment, the number of the chute 136a of the sliding portion 136 is two and they are parallel to each other and respectively disposed on the side-walls at both sides of the recess 132. The extending direction of the recess 132 and the extending direction of the chute 136a are the same, so that the torsional part 140a can move with the rotation-shaft 140. When the keyboard 130 rises up with turning relatively to the second body 120, the keyboard 130 can move relatively to the rotation-shaft 140 through the chute 136a and thus move relatively to the second body 120.

In the embodiment, the sliding portion 136 further includes a first retaining portion 136b, and the first retaining portion 136b is a bump in the chute 136a. The rotation-shaft 140 further has a second retaining portion 140b correspondingly. The second retaining portion 140b is disposed around the rotation-shaft 140 and can move in the chute 136a. When the keyboard 130 slides to a fixed position relatively to the second body 120, the first retaining portion 136b and the second retaining portion 140b get interference by each other so as to fix the position of the keyboard 130 relatively to the second body 120. The invention however does not limit the shapes of the retaining portions 136b and 140b. In other unshown embodiments of the invention, the first retaining portion can be also a protrusive point and the second retaining portion can be correspondingly a recess where the body portion and the fixing portion are positioned by each other through the protrusive point and the recess are positioned by each other.

In summary, the electronic apparatus of the invention can adjust the angle of the keyboard in different operation modes by means of the keyboard able to be turned over, and thus, the keys can be covered and protected. When the first body is closed to the second body to make the display surface face the first surface, the keys on the keyboard are covered by the first body. When the first body is turned over relatively to the second body, the keyboard can be also turned over relatively to the second body, and when the appearance surface of the first body faces the second body to get closed, the keys of the keyboard and the second surface can be located at the same side so that the first body can still cover the keys on the keyboard. In addition, the body portion of the keyboard can slide relatively to the fixing portion, so that when the second body is unfolded from the first body, a good operation angle is provided to the user. As a result, the electronic apparatus of the embodiments can avoid the keys of the keyboard from exposure to make the keys scratched or fall off when the first body is turned over to the back of the second body.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. An electronic apparatus, comprising:
    a first body, having a display surface and an appearance surface opposite to each other;
    a second body, pivoted to the first body and having an accommodating opening and a first surface and a second surface opposite to the first surface, wherein when the first body is closed to the second body, the first surface faces the display surface; and
    a keyboard, pivoted at the accommodating opening through at least one rotation-shaft, wherein when the first body is unfolded from the second body and turned over, the keyboard is able to be turned over relatively to the second body, so that when the second surface faces the appearance surface, the first body covers a plurality of keys of the keyboard, and
    the keyboard further comprises at least one sliding portion, the sliding portion is disposed at a side of the keyboard pivoted at the accommodating opening corresponding to the rotation-shaft, and the sliding portion comprises:
    at least one chute, wherein the rotation-shaft goes through the chute to be pivoted to the keyboard, and when the keyboard rises up with turning relatively to the second body, the keyboard is able to move relatively to the second body by means of the moving of the keyboard relatively to the rotation-shaft through the chute.

2. The electronic apparatus as claimed in claim 1, wherein the rotation-shaft has a torsional part and the torsional part is configured to fix a turning-over-angle of the keyboard towards the second body.

3. The electronic apparatus as claimed in claim 1, wherein the keyboard has a first side-wall and a second side-wall opposite to each other, there are a first accommodating side-wall and a second accommodating side-wall opposite to each other surrounding the accommodating opening of the second body, when the first surface faces the display surface, the first side-wall and the second side-wall respectively face the first accommodating side-wall and the second accommodating side-wall, and when the second surface faces the appearance surface, the first side-wall and the second side-wall respectively face the second accommodating side-wall and the first accommodating side-wall.

4. The electronic apparatus as claimed in claim 3, wherein first side-wall and the second side-wall are respectively an arc surface.

5. The electronic apparatus as claimed in claim 4, wherein the first accommodating side-wall and the second accommodating side-wall are respectively a dent, and the arc surfaces and the dents are complementary to each other.

6. The electronic apparatus as claimed in claim 1, wherein the sliding portion further comprises a first retaining portion, the rotation-shaft correspondingly further has a second retaining portion, and when the keyboard slides to a fixing position relatively to the second body, the first retaining portion and the second retaining portion are able to fix a position of the keyboard relative to the second body.

* * * * *